United States Patent [19]
Yoshinaga

[11] Patent Number: 6,073,842
[45] Date of Patent: *Jun. 13, 2000

[54] OPERATING TERMINAL IN WHICH OPERABLE LEVEL DEPENDING ON OPERATOR CAN BE SET

[75] Inventor: Shinichi Yoshinaga, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/889,040

[22] Filed: Jul. 7, 1997

Related U.S. Application Data

[63] Continuation of application No. 08/754,918, Nov. 22, 1996, abandoned, which is a continuation of application No. 08/337,220, Nov. 7, 1994, abandoned.

[30] Foreign Application Priority Data

Dec. 22, 1993 [JP] Japan .................................. 5-324322

[51] Int. Cl.$^7$ ...................................................... G06K 7/01
[52] U.S. Cl. ........................................ 235/382.5; 235/382
[58] Field of Search .................................... 235/462, 382, 235/382.5

[56] References Cited

U.S. PATENT DOCUMENTS 4,882,474  11/1989  Anderl ..................................... 235/380
5,113,183   5/1992  Mizuno ................................ 340/825.31
5,250,789  10/1993  Johnsen .................................... 235/383
5,272,322  12/1993  Nishida .................................... 235/462
5,304,786   4/1994  Paulidis ................................... 235/462

FOREIGN PATENT DOCUMENTS 59-194261  11/1984  Japan .

Primary Examiner—Karl D. Frech
Attorney, Agent, or Firm—Staas & Halsey, LLP

[57] ABSTRACT

An operating terminal, such as a POS (Point of Sale) terminal, includes an input switch for inputting an operable level indicating a scope of operation which can be performed by an operator, a bar code reader for reading a bar code representing information including at least information regarding an operator and an operable level for the operator, a determination unit for determining whether or not the operable level input by the input switch is equal to the operable level represented by the information obtained by the bar code reader, and a controller, when the determination unit determines that the operable level input by the switch is equal to the operable level input by the input switch is equal to the operable level represented by the information obtained by the bar code reader, for permitting the operator to operate the operating terminal at the operable level.

11 Claims, 9 Drawing Sheets

FIG. 1 (PRIOR ART)

| OPERATOR NO. | NAME | OPERABLE LEVEL |
|---|---|---|
| 01 | YAMADA Hanako | OP |
| 02 | SUGINO Noriko | OP, X |
| ------ | ------ | ------ |
| 98 | SATO Ichiro | OP, X, Z |

FIG. 5

```
1001            H3. 5  20    YAMADA Hanako      16:20
        CHARGE

511     DRESSING "A"                            167
511     DRESSING "B"                            178
526     CABBAGE                                 598
                                               ____
        SUBTOTAL                               ¥943
        TAX                                    ¥ 27
        TOTAL                                  ¥970
```

JAN

NW-7

ITF

CODE 39

PDF 417

DATACODE

VERICODE

CODE I GK

OPERATING TERMINAL IN WHICH OPERABLE LEVEL DEPENDING ON OPERATOR CAN BE SET

This application is a continuation of application Ser. No. 08/754,918, filed Nov. 22, 1996, now abandoned which is a continuation of application Ser. No. 08/337,220 filed Nov. 7, 1994, now abandoned.

BACKGROUND OF THE INVENTION (1) Field of the Invention

The present invention generally relates to an operating terminal such as a POS (Point of Sales) terminal placed in a store, and more particularly to an operating terminal in which an operable level depending on an operator can be selected from among a plurality of operable levels, such as a level in which only a registration operation for commodities can be performed, a level in which a checking operation for proceeds can be also performed and a level in which a settlement operation for proceeds can be further performed.

(2) Description of the Related Art

Conventionally, in stores, POS terminals are popular, and the registration of commodities, the checking of proceeds, the settlement of the proceeds and the like are performed by using the POS terminals. In the POS terminals, operable levels for operators may be set for security. The operable level indicates a scope of operation which can be performed by an operator.

In a case where the operable levels for operators are prescribed in a POS terminal, an operator number identifying an operator is registered by a manual operation or by reading a bar code in the POS terminal before starting an input operation for information regarding commodities, and a operable level table as show in FIG. 1 provided in the POS terminal or in a host is retrieved so that an operable level corresponding to the operator identified by the registered operator number is decided. The operable level table shown in FIG. 1 indicates operators' names and operable levels for the respective operators corresponding to the operator numbers. When an operator number is input to the POS terminal, the operable level table is retrieved for a corresponding operable level based on the input operator number. In FIG. 1, an OP level is an operable level in which only a registration operation for commodities can be performed, an X level is an operable level in which a checking operation for proceeds can be also performed and a Z level is an operable level in which a settlement operation for proceeds can be further performed.

In addition, there is a case where an operator's name is printed on a recording sheet such as a receipt. In this case, an operator's name file is retrieved for an operator's name identified by an operator number input to the POS terminal, and the operator's name is printed on the recording sheet.

In the above conventional POS terminal, to set an operable level for an operator of the POS terminal, before starting an input operation to the POS terminal, the operable table indicating a plurality of operable levels must be made in the POS terminal or the host, and the operable table must be retrieved. Thus, the structure of the POS terminal is complex and operations of the POS terminal is troublesome.

SUMMARY OF THE INVENTION

Accordingly, a general object of the present invention is to provide an operating terminal, such as a POS terminal, in which the disadvantages of the aforementioned prior art are eliminated.

A specific object of the present invention is to provide an operating terminal in which an operable level can be set without providing the operable level table as shown in FIG. 1 therein or in a host.

The above objects of the present invention are achieved by an operating terminal comprising: input means for inputting an operable level indicating a scope of operation which can be performed by an operator; reading means for reading a bar code representing information including at least information regarding an operator and an operable level for the operator; determination means for determining whether or not the operable level input by the input means is equal to the operable level represented by the information obtained by the reading means; and control means, when the determination means determines that the operable level input by the input means is equal to the operable level represented by the information obtained by the reading means, for permitting the operator to operate the operating terminal at the operable level.

According to the present invention, when the determination means determines that the operable level input by the input means is equal to the operable level represented by the information obtained by the reading means, the operator is permitted to operate the operating terminal at the operable level. Thus, an operable level can be set in the operation terminal without providing the operable level table as shown in FIG. 1 therein or in a host.

Another object of the present invention is to provide an operating terminal in which an operator's name can be easily printed on a recording sheet.

The above objects of the present invention are achieved by the above operating terminal, which is a POS terminal, further comprising print control means for controlling a printer of the POS terminal so that the information regarding the operator read by the reading means is printed on a sheet on which transaction information is printed.

According to the present invention, the operator's name included in the information regarding the operator can be easily printed on the recording sheet.

BRIEF DESCRIPTION OF THE DRAWINGS

Other objects, features and advantages of the present invention will become more apparent from the following detailed description when read in conjunction with the accompanying drawings, in which:

FIG. 1 is a diagram illustrating an operable level table;

FIG. 5 is a diagram illustrating a keyboard;

DESCRIPTION OF THE PREFERRED EMBODIMENTS

A description will be given, with reference to FIG. 2A, of the principle of a POS terminal according to an embodiment of the present invention.

Figure 2A:
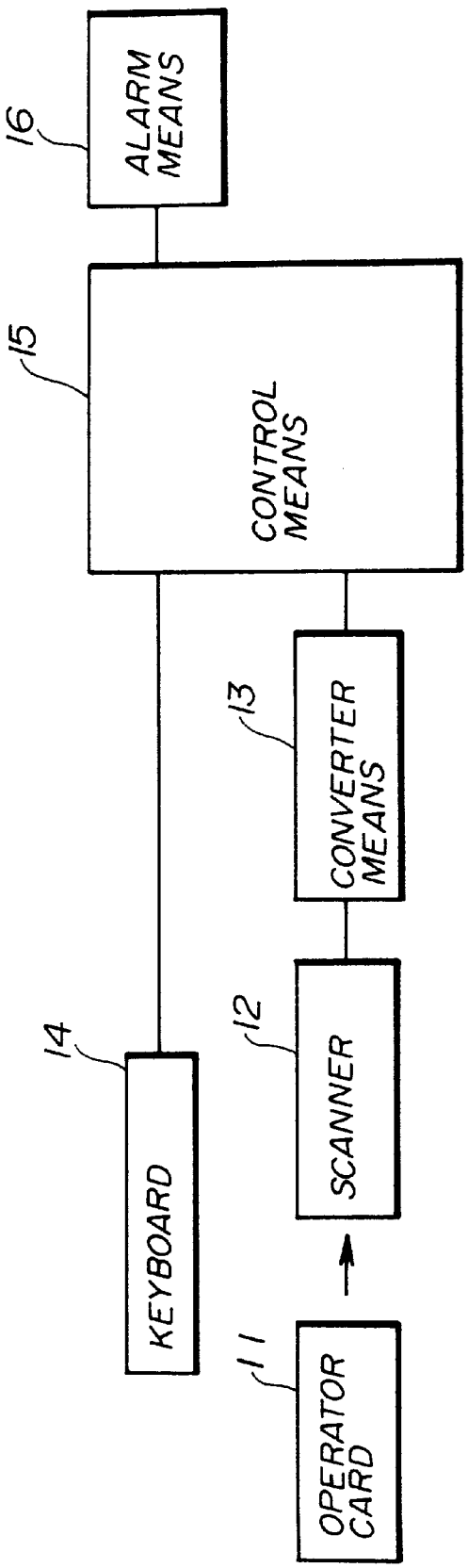
FIG. 2A is a block diagram illustrating the principle of a POS terminal according to an embodiment of the present invention.

Referring to FIG. 2A, the POS terminal has a scanner 12, converter means 13, a keyboard 14, control means 15 and alarm means 16. An operator inputs an operable level in this POS terminal by means of the keyboard 14. An operator card 11 on which a high-density bar code is indicated is optically read by the scanner 12. The high-density bar code represents at least operator identification information and information regarding an operable level assigned to an operator identified by the operator identification information. The converter means 13 converts pattern information obtained by scanning the high-density bar code into information having a format which can be processed in this POS terminal. The control means 15 compares the operable level input by using the keyboard 14 with the operable level read from the operator card 11 scanned by the scanner 12. When it is determined that the both operable levels are equal to each other, the operable level is set in the POS terminal and the POS terminal permits the operator to use the POS terminal in the operable level. On the other hand, if it is determined that both operable levels differ from each other, the operable level input by using the keyboard 14 is not set in the POS terminal and the alarm means 16 raises an alarm.

In the above POS terminal, an operable level input by the keyboard 14 is set or not set based on whether or not the operable level input by the keyboard 14 is equal to an operable level read from the operator card scanned by the scanner 12. That is, even if the operable level table as shown in FIG. 1 is not provided in the POS terminal or in the host, an operable level can be set in the POS terminal and an operator can be use the POS terminal at the operable level.

A description will now be given of an embodiment of the present invention.

Figure 2B:
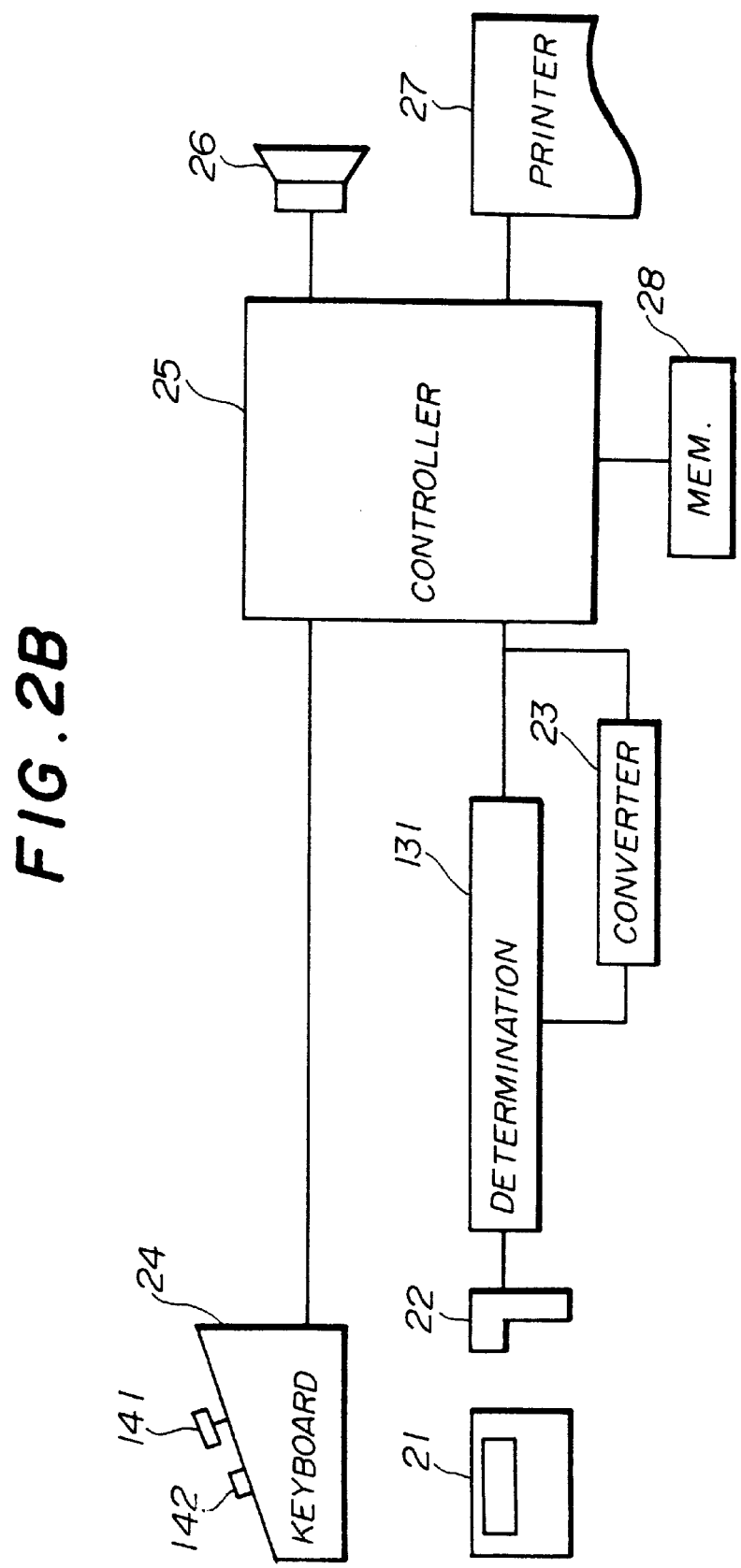
FIG. 2B is a block diagram illustrating a POS terminal according to the embodiment of the present invention.

A POS terminal according to the embodiment of the present invention is formed as shown in FIG. 2B. Referring to FIG. 2B, the POS terminal has a scanner 22, a determination unit 131, a converter unit 23, a keyboard 24, a controller 25, an alarm unit 26, a printer 27 and a memory unit 28. The scanner 22 can optically read normal bar codes and high-density bar codes. The normal bar code is printed on a label put on each commodity and represents information regarding the commodity, such as a unit price of the commodity and the identification of the commodity.

Figure 8A:
FIGS. 8A, 8B, 8C and 8D are diagrams illustrating examples of a normal bar code.
Figure 8B:
Figure 8C:
Figure 8D:

Examples of the normal bar code are shown in FIGS. 8A, 8B, 8C and 8D. A bar code shown in FIG. 8A is a JAN type bar code which is mainly used in the food trade. A bar code shown in FIG. 8B is an NW-7 type bar code which is mainly used in the apparel trade. A bar code shown in FIG. 8C is an ITF type bar code which is mainly used in the distribution trade. A bar code shown in FIG. 8D is a CODE 39 type bar code, which is mainly used for industrial products.

The high-density bar code is formed of a multi dimensional code pattern and can represent about 500 characters (Chinese characters and cursive kana characters) in a predetermined area (about 1.5 centimeters multiplied by a few centimeters). That is, the high-density bar code can represent a significantly larger amount of information than the normal bar code described above. The high-density bar code is printed on an operator card 21 and represents information regarding an operator, such as an operator's name, an operator, number identifying the operator and an operable level in which the operator can use the POS terminal.

Figure 8E:
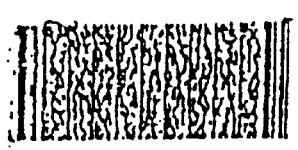
FIGS. 8E, 8F, 8G and 8H are diagrams illustrating examples of a high-density bar code.
Figure 8F:
Figure 8G:
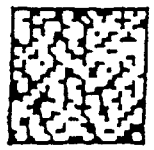
Figure 8H:

Examples of the high-density bar code are shown in FIGS. 8E, 8F, 8G and 8H. A code pattern shown in FIG. 8E is referred to as PDF 417, a code pattern shown in FIG. 8F is referred to as a DATACODE, a code pattern shown in FIG. 8G is referred to as a VERICODE, and a code pattern shown in FIG. 8H is referred to as a code 16K.

Figure 3:
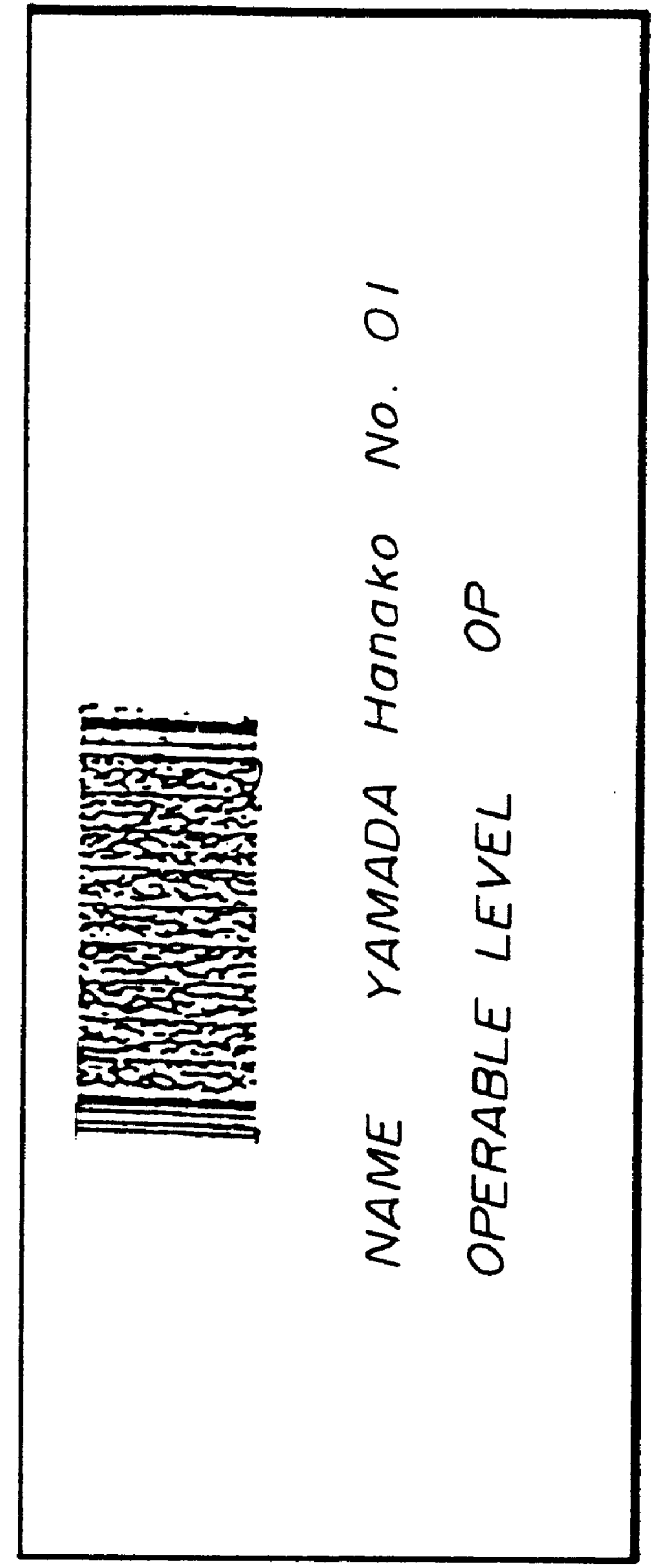
FIG. 3 is a diagram illustrating an example of a receipt on which information regarding commodities is printed.

An operator has only one operator card 21 indicating information regarding the operator. The operator card 21 is formed, for example, as shown in FIG. 3. Referring to FIG. 3, the operator card 21 indicates an operator's name (NAME "YAMADA hanako"), an operator number (No. "01") identifying the operator, an operable level ("OP LEVEL") and a high-density bar code representing the above information items (the operator's name, the operator number and the operable level).

The determination unit 131 determines, based on information output from the scanner 22, whether a bar code read by the scanner 22 is the normal bar code or the high-density bar code. When the determination unit 131 determines that the bar code read by the scanner 22 is the high-density bar code, the information (bar-code information) output from the scanner 22 is supplied to the converter unit 23 via the determination unit 131. The converter unit 23 converts the bar-code information into information (e.g. character codes) which can be processed by the controller 25. The information output from the converter unit 23 includes information representing the operator's name, the operator number and the operable level. On the other hand, if the determination unit 131 determines that the bar code read by the scanner 22 is the normal bar code, the information output from the scanner 22 is directly supplied to the controller 25.

Figure 4:
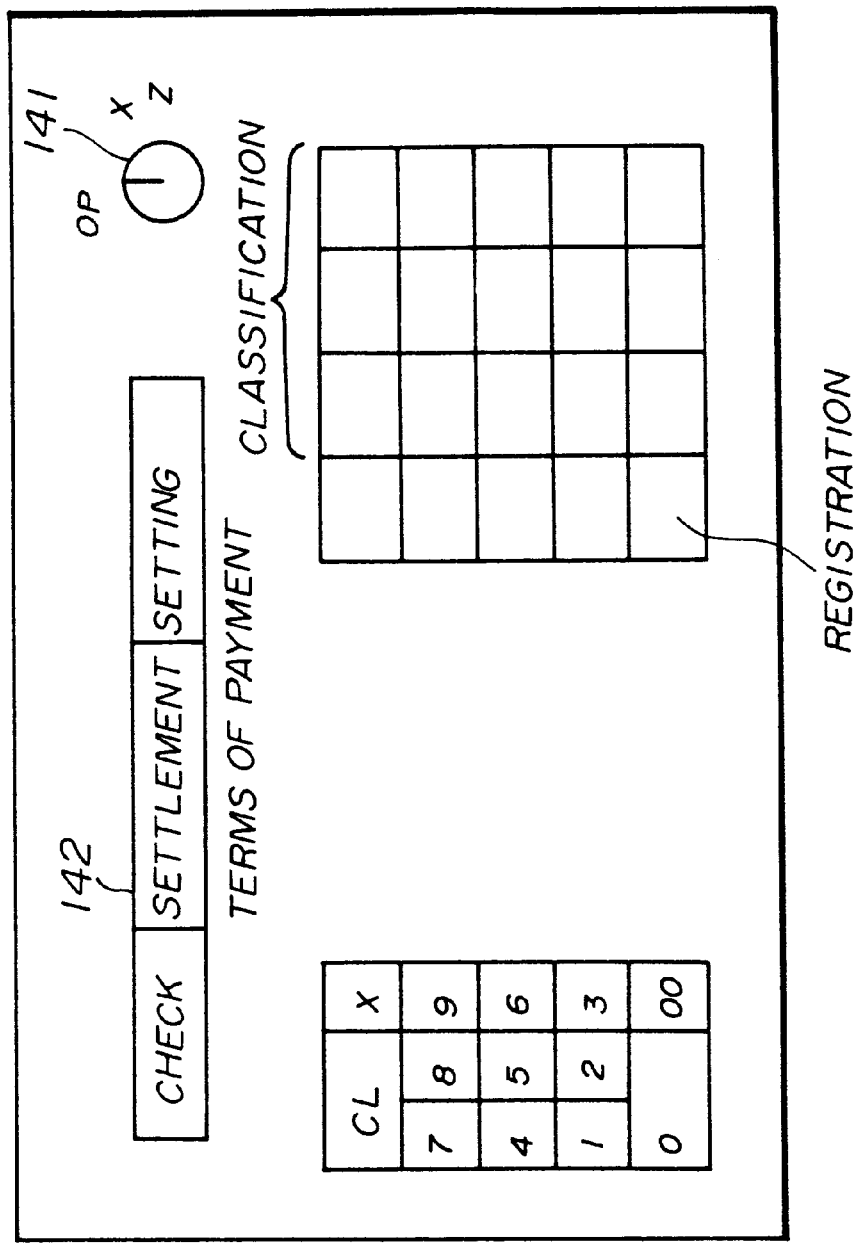
FIG. 4 is a diagram illustrating an example of an operator card.

The keyboard 24 is formed as shown in FIG. 4. Referring to FIG. 4, the keyboard 24 has an operator switch 141, operation-mode selecting keys 142, ten-key, keys for inputting terms of payment, such as payment in cash and payment with credit, and keys for inputting classifications of commodities, such as vegetable, meat and the like. The operator switch 141 is used to set an operable level of an operator before the operator starts to operate the POS terminal. The operator switch 141 has four setting positions. The first setting position is referred to as a lock position. When the operator switch 141 is set at the lock position, the keyboard 24 is fixed. The second setting position is referred to as an OP position. When the operator switch 141 is set at the OP position, an OP operable level is input to the POS terminal. In the OP operable level, a general operator can perform the normal registration operation for sold commodities. The third setting position is referred to as an X position. When the operator switch 141 is set at the X position, an X operable level is input to the POS terminal. In the X operable level, an operator can perform checking proceeds of commodities. The X operable level is assigned, for example, to managers. The fourth setting position is referred to as a Z position. When the operator switch 141 is set at the Z position, a Z operable level is input to the POS terminal. In the Z operable level, an operator can perform the settlement of proceeds. The Z operable level is assigned, for example, to a general manager. The operation-mode selecting keys 142 includes a checking-mode key, a settlement-mode key and a setting-mode key. When no operation-mode selecting keys 142 are operated, the POS terminal is in a state where the normal registration operation using the ten-key, the keys for inputting the terms of payment and the key for inputting the classifications of commodities can be performed. When the checking-mode key is operated, the proceeds of commodities can be checked in the POS terminal. When the settlement-mode key is operated, the settlement of proceeds can be performed in the POS terminal. When the setting-mode key is operated, an operable level for an operator can be set in the POS terminal.

The controller 25 controls all units in the POS terminal and performs the registration of sold commodities, the check of the sold commodities and the settlement of proceeds. The controller 25 compares information read from the operator card 21 and information input by the operator switch 141, and controls the alarm unit 26 based on a result of the comparing operation. The controller 25 controls the memory unit 28 so that an operator' name, an operator number and an operable level represented by information into which the bar-code information is converted by the converter unit 23 are temporarily stored in the memory unit 28. The memory unit 28 has a ROM in which programs and other fixed data have been stored and a RAM in which temporary data, such as flags, programs read out from the ROM, the operator's name, the operator number and the operable level are to be stored.

The printer 27 is used to print on a receipt particulars of sold commodities, such as names of the sold commodities, classification numbers of the commodities, unit prices of the commodities and a total account of the commodities input by the scanner 22 or the keyboard 24. The printer 27 prints also an operator's name stored in the memory unit 28 on the receipt as shown in FIG. 5. On the receipt shown in FIG. 5, an operator's name "YAMADA Hanako" is printed along with the date and the time at which the registration operation for commodities has been performed in the POS terminal and particulars of sold commodities.

Figure 6:
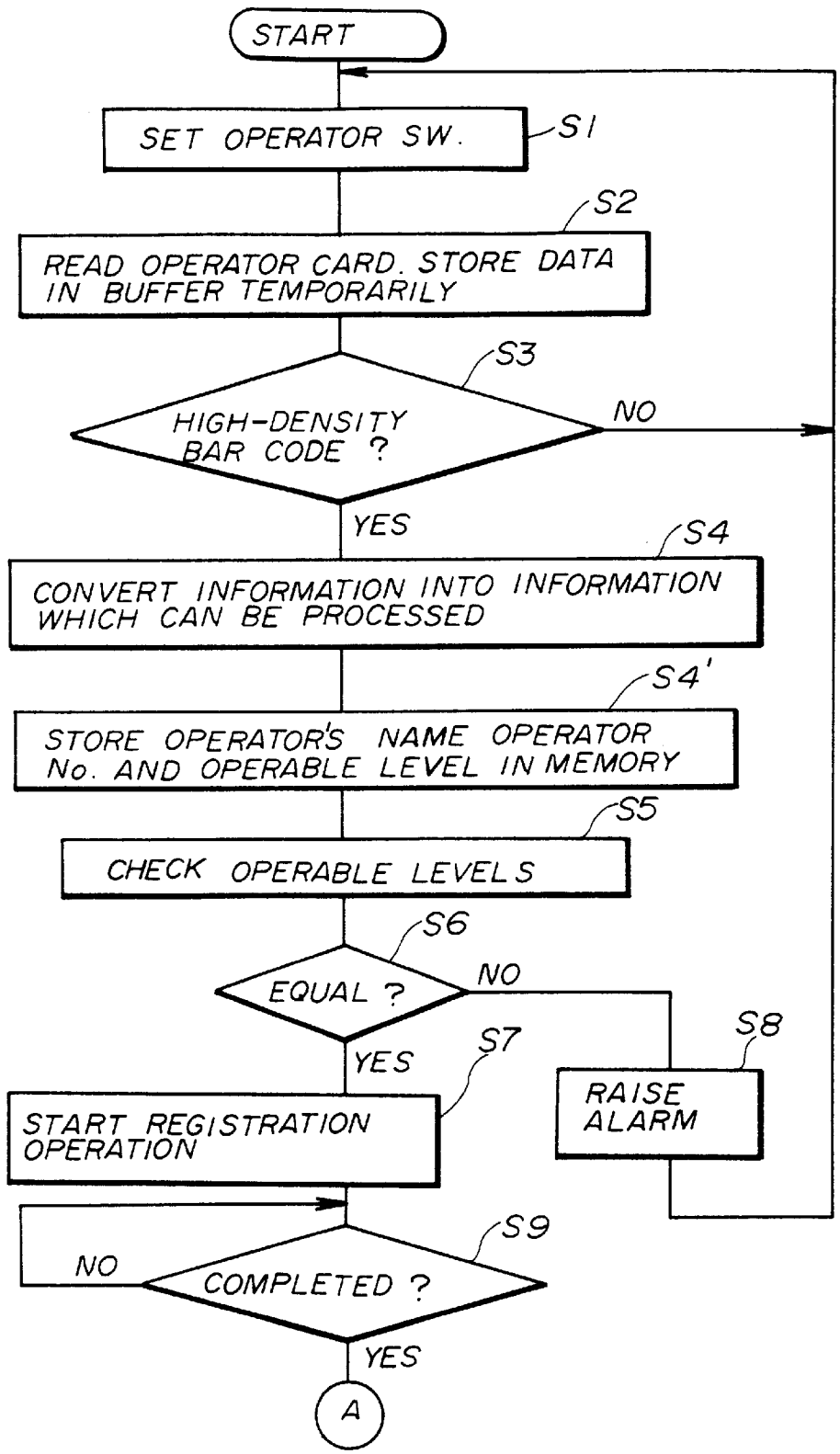
FIG. 6 and FIG. 7 are flow charts illustrating operations of the POS terminal.

After the operator operates the setting-mode key out of the operation-mode selecting keys 142, the process for setting an operable level for the operator is executed in accordance with a flow chart shown in FIG. 6. The operator has previously received an operator card 21 on which the information regarding the operator is indicated as shown in FIG. 3.

Referring to FIG. 6, the operator operates the operator switch 141 so that the operator switch 141 in the keyboard 24 is set at, for example, the X position (step S1). After this, the operator operates the scanner 22 so that the scanner 22 scans the high-density bar code on the operator card 21, and the output information from the scanner 22 is temporarily stored in a buffer (not shown) in the determination unit 131 (step S2). The determination unit 131 determines, based on the information stored in the buffer, whether or not the bar code scanned by the scanner 22 is the high-density bar code (step S3). If the determination unit 131 determines that the bar code scanned by the scanner 22 is the high-density bar code, the information stored in the buffer is supplied to the converter unit 23. When the converter unit 23 receives the information from the determination unit 131, the converter 23 converts the received information into information which can be processed by the controller 25 so that an operator's name, an operator number and an operable level are received by the controller 25 (step S4). The operator's name, the operator number and the operable level are stored in the memory unit 28 (step S4').

After this, the controller 25 reads out the operable level from the memory unit 28 and compares the operable level with the X level identified by the X position at which the operator switch 141 has been set (step S5). It is then determined whether or not the operable level read out from the memory 28 is equal to the X level which has been input by the operator switch 141 (step S6). If the operable level read out from the memory 28 is not the X level, the controller 25 supplies a control signal to the alarm unit 26, so that the alarm unit 26 raises an alarm (step S8). As a result, the alarm calls the operator's attention. After this, the process returns to the step S1.

On the other hand, if it is determined, in step S6, that the operable level read out from the memory is equal to the X level, the POS terminal becomes in a state where operations can be performed in the X level. That is, the registration operation for sold commodities using the scanner 22 or the keyboard 24 and the checking operation for proceeds can be performed in the POS terminal. If the operator performs no operation in this state, the registration operation can be performed. If the operator operates the checking-mode key out of the operation-mode selecting keys 142 in this state, the checking operation can be performed.

Figure 7:
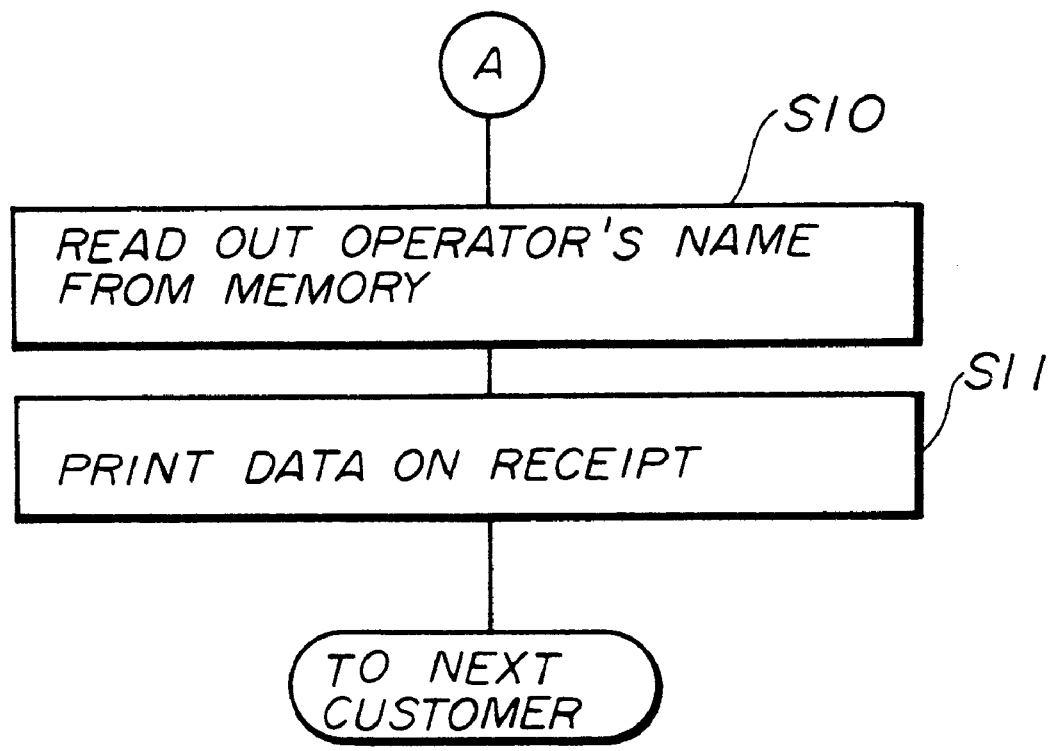

When the operator starts, for example, the registration operation (step S7), the controller 25 processes input information (prices of commodities, classification numbers of commodities and the like) from the scanner 22 and the keyboard 24 in the registration operation mode. In this state, it is determined whether or not the registration operation has been completed (step S9). If it is determined that the registration operation has been completed, the process proceeds to step S10 shown in FIG. 7. That is, the operator's name is read out from the memory unit 28 (step S10), and the operator's name is supplied to the printer 27. The printer 27 prints the operator's name on a receipt on which the particulars of sold commodities has been printed in the registration operation mode, as shown in FIG. 5 (step S11).

According to the above embodiment, since the operator's name, the operator number and the operable level are recorded on the operator card 21 by using the high-density bar code, the operable level for the operator can be identified by reading the high-density bar code without using the operable level table as shown in FIG. 1. In addition, the operator's name can be printed on the receipt based on the information read from the operator card 21.

Furthermore, since the information regarding the operator's name, the operator number and the operable level is input to the POS terminal by optically scanning the high-density bar code, the input operation is simple and can be rapidly performed. In addition, since only when information recorded on the operator card given to an operator and information input by the operator are equal to each other, the operation can be performed in the POS terminal, the security can be improved.

The high-density bar code can represent a large amount of information items. Thus, if various information items are recorded by using the high-density bar code, the operator card 21 can be used for other objects, for example, as an employee card on which information regarding an employee is recorded.

The present invention is not limited to the aforementioned embodiments, and variations and modifications may be made without departing from the scope of the claimed invention.

What is claimed is:

1. An operating terminal comprising:
    input means for manually inputting a first operable level information indicating a scope of operation which is to be performed by an operator;
    reading means for reading a bar code representing a second operable level information indicating an operable level of the operator; and
    control means for determining whether the first operable level information input by said input means is equal to the second operable level information obtained from the bar code read by said reading means wherein, when said control means determines that the first operable level information is equal to the second operable level information, the control means permits the operator to operate said operating terminal at the input operable level.

2. The operating terminal as claimed in claim 1, wherein said operating terminal is a point of sales terminal having a bar code reader for reading a bar code provided on an article.

3. The operating terminal as claimed in claim 2, wherein said control means controls a printer of said point of sales terminal so that the information regarding the operator read by said reading means is printed on a sheet on which transaction information is printed.

4. The operating terminal as claimed in claim 1, wherein said reading means is a bar code reader.

5. The operating terminal as claimed in claim 4, wherein said bar code, representing information including at least information regarding an operator and an operable level for the operator, is a high-density bar code formed of a multi-dimensional code pattern, and wherein said operating terminal further comprises determination means including:

first means for determining, based on the information obtained by said reading means, whether or not the bar code read by said reading means is the high-density bar code; and second means, when said first means determines that the bar code read by said reading means is the high-density bar code, for converting the information obtained by said reading means into information which can be used in a determination process of said control means, so that said control means determines whether or not the operable level input by said input means is equal to the operable level represented by said information obtained by said second means.

6. The operating terminal as claimed in claim 5 further comprising storage means for storing the information obtained by said second means, wherein said control means determines whether or not the operable level input by said input means is equal to the operable level represented by said information stored in said storage means.

7. The operating terminal as claimed in claim 6, wherein said control means controls a printer of said point of sales terminal so that the information regarding the operator stored in said storage means is printed on a sheet on which transaction information is printed.

8. The operating terminal as claimed in claim 1, wherein said bar code, representing the information including at least the information regarding the operator and the operable level for the operator, is a high-density bar code formed of a multi-dimensional code pattern.

9. The operating terminal as claimed in claim 1, further comprising:

alarm means, when said control means does not determine that the operable level input by said input means is equal to the operable level represented by said information obtained by said reading means, for raising an alarm.

10. An operating terminal comprising:

input means for manually inputting an operable level indicating a scope of operation which is to be performed by an operator;

reading means for reading a bar code representing information including at least information regarding an operator and an operable level for the operator; and control means for determining whether the operable levels which are supplied as a pair by said input means and said reading means, are equal to each other, and for permitting the operator to operate said operating terminal at the input operable level when the operable levels are equal to each other.

11. A method for operating an operating terminal comprising the steps of:

(a) manually inputting a first operable level information indicating a scope of operation which is to be performed by an operator;

(b) reading a code representing a second operable level information indicating an operable level of the operator;

(c) comparing the first operable level information manually input in step (a) and the second operable level information obtained from the code read in step (b); and (d) automatically permitting the operator to operate the operating terminal at the input operable level when the first operable level information and the second operable level information which are compared in step (c) correspond to each other.

* * * * *